United States Patent
Attibele et al.

(10) Patent No.: US 12,359,707 B1
(45) Date of Patent: Jul. 15, 2025

(54) ELECTRIFIED VEHICLE PROPULSION SYSTEM ARCHITECTURE THAT PROVIDES HIGH PERFORMANCE WITHOUT MULTISPEED REDUCER

(71) Applicant: FCA US LLC, Auburn Hills, MI (US)

(72) Inventors: Pradeep R Attibele, Ann Arbor, MI (US); Sandeep Makam, Rochester Hills, MI (US); Mark A Levine, White Lake, MI (US); Tejinder Singh, West Bloomfield, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 18/650,843

(22) Filed: Apr. 30, 2024

(51) Int. Cl.
| | |
|---|---|
| *F16H 1/46* | (2006.01) |
| *B60K 1/02* | (2006.01) |
| *B60K 17/02* | (2006.01) |
| *B60K 17/04* | (2006.01) |
| *H02K 7/108* | (2006.01) |
| *H02K 7/116* | (2006.01) |

(52) U.S. Cl.
CPC ............... *F16H 1/46* (2013.01); *B60K 1/02* (2013.01); *B60K 17/02* (2013.01); *B60K 17/04* (2013.01); *H02K 7/108* (2013.01); *H02K 7/116* (2013.01)

(58) Field of Classification Search
CPC .............. F16H 1/46; B60K 1/02; B60K 17/04
USPC ..................................................... 180/65.6
See application file for complete search history.

(56) References Cited

U.S. PATENT DOCUMENTS

| | | | | |
|---|---|---|---|---|
| 7,172,524 B2 * | 2/2007 | Moeller | ................... | B60L 50/16 477/3 |
| 7,651,425 B2 * | 1/2010 | Shimizu | ................... | B60K 6/26 475/5 |
| 7,753,821 B2 * | 7/2010 | Ueda | ......................... | F16H 1/48 475/331 |
| 8,246,508 B2 * | 8/2012 | Matsubara | ............ | B60W 10/06 477/107 |
| 8,430,782 B2 * | 4/2013 | Akutsu | ................... | H02K 51/00 475/269 |
| 9,109,674 B2 * | 8/2015 | Duhaime | ................ | F16H 3/725 |
| 9,188,195 B2 * | 11/2015 | Iwasa | ....................... | F16H 3/727 |
| 10,549,624 B2 * | 2/2020 | Liu | .......................... | F16H 3/728 |
| 10,723,224 B2 * | 7/2020 | Misu | ....................... | F16H 3/728 |
| 11,180,016 B2 * | 11/2021 | Qiu | ......................... | B60K 6/387 |
| 11,603,909 B2 * | 3/2023 | Lee | .......................... | F16H 3/728 |

(Continued)

*Primary Examiner* — Derek D Knight
(74) *Attorney, Agent, or Firm* — Jeremy J. Klobucar

(57) ABSTRACT

An electric drive module for an electrified vehicle includes first and second electric motors, first and second reduction assemblies and a driveline. The first electric motor has a first rotatable output. The second electric motor has a second rotatable output. The first electric motor has a lower output capacity than the second electric motor. The first reduction assembly is driven by the first rotatable output and includes a first reduction output that is coupled to the second electric motor. The second reduction assembly is driven by the second rotatable output of the second electric motor. The first reduction assembly and the second reduction assembly cooperate to provide a combined first effective reduction ratio driven by the first rotatable output and wherein the second reduction assembly provides a second effective reduction ratio driven by the second rotatable output, the first effective reduction ratio being higher than the second first effective reduction ratio.

16 Claims, 3 Drawing Sheets

(56) References Cited

U.S. PATENT DOCUMENTS

| | | | |
|---|---|---|---|
| 11,859,704 B2* | 1/2024 | Wang | B60K 23/04 |
| 2022/0196134 A1* | 6/2022 | Ikemura | B60K 17/02 |

* cited by examiner

ELECTRIFIED VEHICLE PROPULSION SYSTEM ARCHITECTURE THAT PROVIDES HIGH PERFORMANCE WITHOUT MULTISPEED REDUCER

FIELD

The present application generally relates to electrified vehicles and, more particularly, to an electrified vehicle having two electric motors that provide high performance without a multispeed reducer.

BACKGROUND

An electrified vehicle (hybrid electric, plug-in hybrid electric, range-extended electric, battery electric, etc.) includes at least one battery system and at least one electric motor. Typically, the electrified vehicle would include a high voltage battery system and a low voltage (e.g., 12 volt) battery system. In such a configuration, the high voltage battery system is utilized to power at least one electric motor configured on the vehicle and to recharge the low voltage battery system via a direct current to direct current (DC-DC) convertor.

Electrified vehicles generally include a powertrain configured to generate and transfer drive torque to a driveline of the vehicle for propulsion. The electrified powertrain generally comprises the high voltage battery system, one or more electric motors, and one or more transmissions. The electric motors and transmission can be referred to as an electric drive module. In some electrified vehicle configurations, such as performance vehicles, high torque (or high torque multiplication) is required at launch for acceleration performance, and moderately high power at very high motor speeds (with lower torque multiplication) to achieve maximum vehicle speed. This is easily achieved with a multispeed transmission. However, multispeed transmissions require a gear shift which could adversely affect the vehicle performance characteristics. Similarly, in off-road electrified vehicles, a very high torque may be needed at very low speeds for off-road driving. Again, a multispeed transmission can be provided, but presents the different drawbacks. Accordingly, while such electric drive modules having transmissions do work well for their intended purpose, there exists an opportunity for improvement in the relevant art.

SUMMARY

According to one example aspect of the invention, an electric drive module for an electrified vehicle includes first and second electric motors, first and second reduction assemblies and a driveline. The first electric motor has a first rotatable output. The second electric motor having a second rotatable output. The first electric motor has a lower output capacity than the second electric motor. The first reduction assembly is driven by the first rotatable output and includes a first reduction output that is coupled to the second electric motor. The second reduction assembly is driven by the second rotatable output of the second electric motor and includes a second reduction output. The first reduction assembly and the second reduction assembly cooperate to provide a combined first effective reduction ratio driven by the first rotatable output. The second reduction assembly provides a second effective reduction ratio driven by the second rotatable output. The first effective reduction ratio is higher than the second first effective reduction ratio. The driveline receives torque from the second reduction output and communicates the torque to drive axles of the electrified vehicle.

In some implementations, the first electric motor comprises a first stator, a first rotor and the first rotatable output.

In some implementations, the electric drive module further comprises a one-way clutch disposed between the first rotatable output of the first electric motor and the first reduction assembly.

In additional arrangements, the second electric motor comprises a second stator, a second rotor and the second rotatable output.

In examples, the first reduction assembly comprises a first planetary gearset having a first ring gear, a first carrier and a first sun gear. The first ring gear is grounded (fixed at zero speed). The first electric motor is fixed to the sun gear via the one-way clutch.

In other examples, the second reduction assembly comprises a second planetary gearset having a second ring gear, a second carrier and a second sun gear. The second ring gear is grounded (fixed at zero speed). The second electric motor is fixed to the sun gear. The second carrier is coupled to the final drive gearset.

In other implementations, the first reduction assembly has a reduction ratio of between 8 and 12.

In implementations, the first electric motor has an output of between 50 and 100 Nm.

In additional implementations, the second electric motor has an output of between 400 and 500 Nm.

According to another example aspect of the invention, an electric drive module for an electrified vehicle includes first and second electric motors, first and second reduction assemblies and a driveline. The first electric motor has a first rotatable output. The second electric motor having a second rotatable output. The first electric motor has a lower output capacity than the second electric motor. The first reduction assembly is driven by the first rotatable output and includes a first reduction output. The second reduction assembly is driven by the first reduction output includes a second reduction output. The overall ratio for the torque from the first electric motor will be higher. The driveline receives torque from the second reduction output and communicates the torque to drive axles of the electrified vehicle.

In some implementations, the first electric motor comprises a first stator, a first rotor and the first rotatable output.

In some implementations, the electric drive module further comprises a one-way clutch disposed between the first rotatable output of the first electric motor and the first reduction assembly.

In additional arrangements, the second electric motor comprises a second stator, a second rotor and the second rotatable output.

In examples, the first reduction assembly comprises a first planetary gearset having a first ring gear, a first carrier and a first sun gear. The first ring gear is grounded (fixed at zero speed). The first electric motor is fixed to the sun gear via the one-way clutch.

In other examples, the second reduction assembly comprises a second planetary gearset having a second ring gear, a second carrier and a second sun gear. The second ring gear is grounded (fixed at zero speed). The second electric motor is fixed to the sun gear. The second carrier is coupled to the final drive gearset.

In other implementations, the first reduction assembly has a reduction ratio of between 8 and 12.

In implementations, the first electric motor has an output of between 50 and 100 Nm.

In additional implementations, the second electric motor has an output of between 400 and 500 Nm.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

As discussed above, in some electrified vehicle configurations, such as performance vehicles, high torque (or high torque multiplication) is required at launch for acceleration performance, and moderately high power at very high motor speeds (with lower torque multiplication) to achieve maximum vehicle speed. This is easily achieved with a multispeed transmission or gearbox. Using a two-speed (or more) reducer means there has to be one or more gearshifts. In electrified vehicles having high accelerations (0-60 MPH in less than around 3 seconds), a fast shift, such as one that takes 300 milliseconds is not acceptable.

Furthermore, multispeed transmissions require a gear shift which could adversely affect the vehicle performance characteristics. Some electrified vehicles provide a multispeed gearbox on one of the axles or use very high-power motors, and in some cases, as many as four high-power motors, one for each wheel. In some examples, even with that configuration, the powertrain may still be somewhat lacking in peak available axle torque. Similarly, in off-road electrified vehicles, a very high torque may be needed at very low speeds for off-road driving. Again, a multispeed transmission can be provided, but presents the above drawbacks.

Accordingly, the instant application provides an architecture that develops high torque at launch using electric motors with modest torque capacity, without using a multispeed gearbox (reducer). The present disclosure provides two electric motors, with one of them being relatively small capacity. A one way clutch or an induction motor (instead of a permanent magnet motor) should be incorporated to optimize high torque during various operating conditions.

Figure 1:
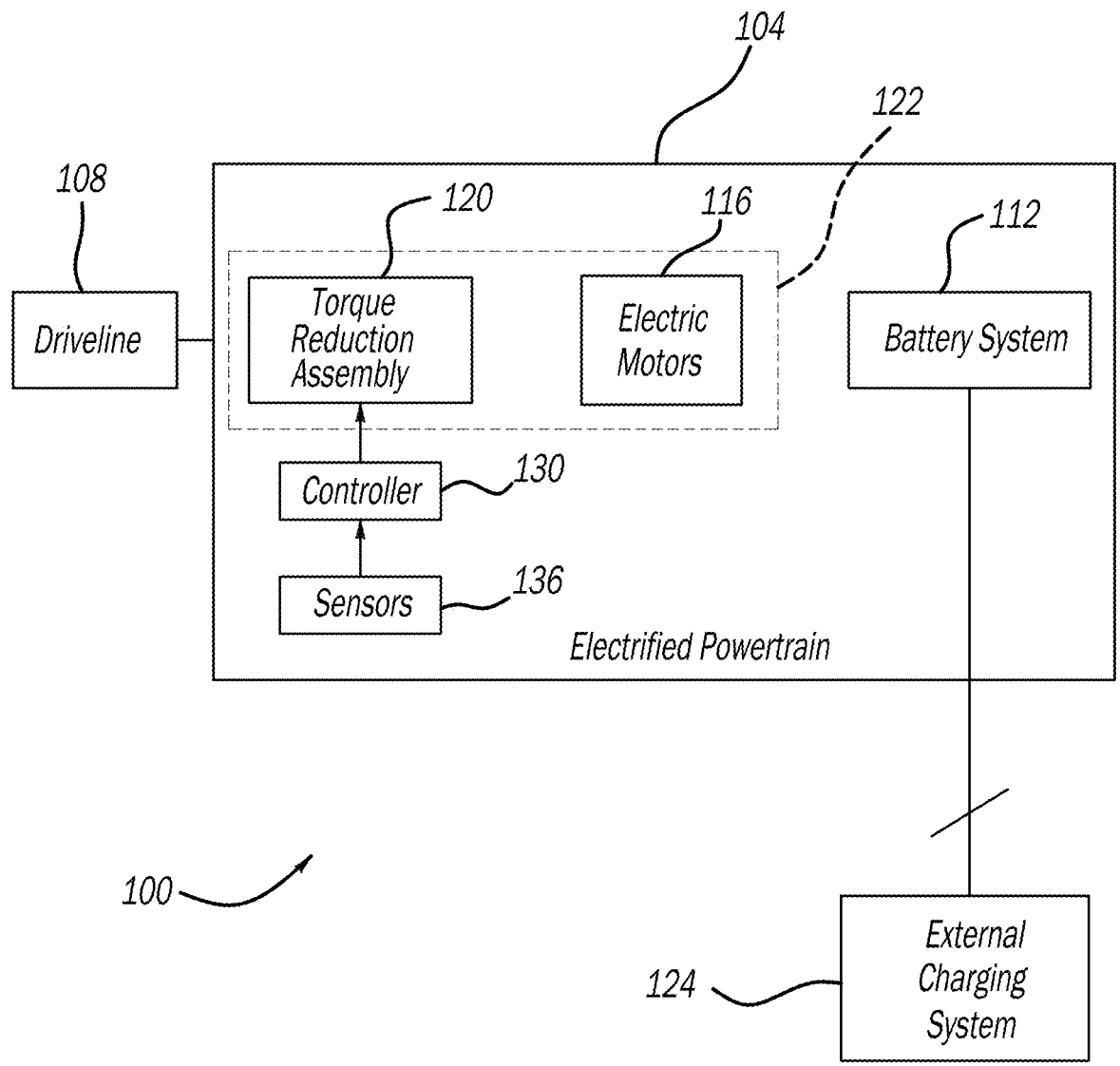
FIG. 1 is a functional block diagram of an electrified vehicle having an electric drive module according to the principles of the present application.

Referring now to FIG. 1, a functional block diagram of an example electrified vehicle 100 (also referred to herein as "vehicle 100") according to the principles of the present application is illustrated. The vehicle 100 includes an electrified powertrain 104 configured to generate and transfer drive torque to a driveline 108 of the vehicle 100 for propulsion. The electrified powertrain 104 generally comprises a high voltage battery system 112 (also referred to herein as "battery system 112"), two electric motors, collectively identified at 116, and a torque reduction assembly 120. As will be described herein, the two electric motors 116 include a first low torque electric motor 116A and a second high torque electric motor 116B. The electric motors 116 and the torque reduction assembly 120 can be collectively referred to herein as an electric drive module 122. The battery system 112 is selectively connectable (e.g., by the driver) to an external charging system 124 (also referred to herein as "charger 124") for charging of the battery system 112. The electric drive module 122 receives signals from a controller 130 indicative of operational requests based on information obtained by sensors 136 throughout the vehicle.

Figure 2:
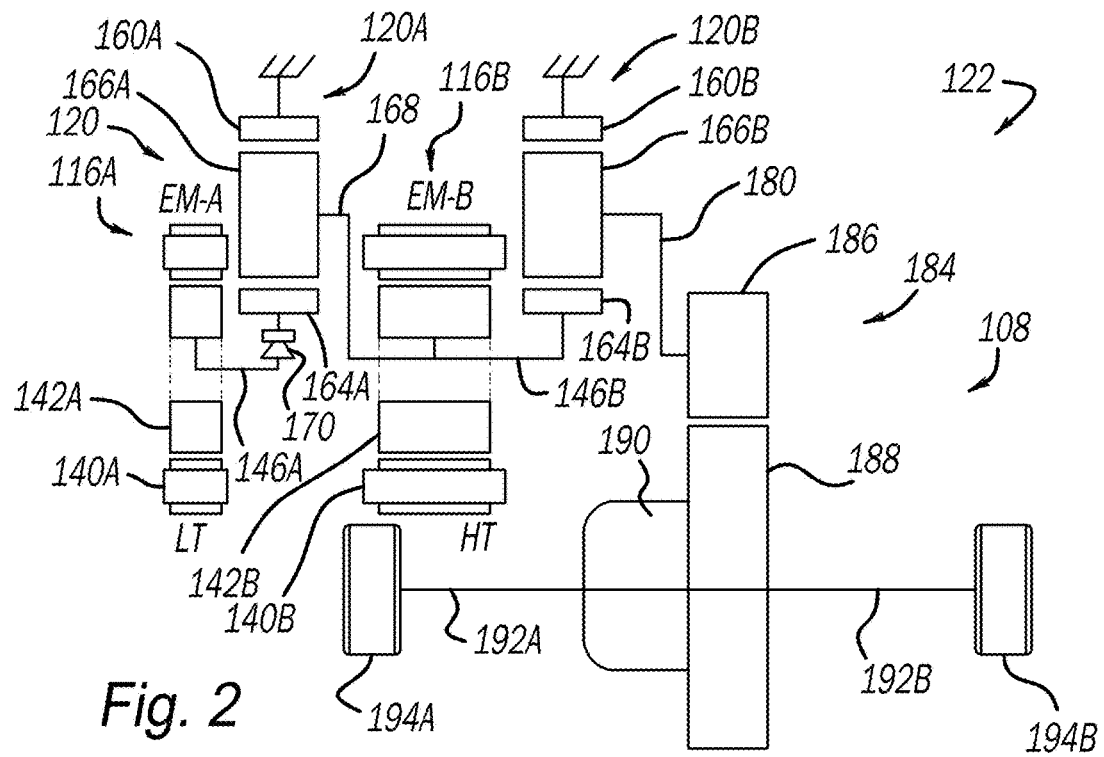
FIG. 2 is a schematic illustration of an electric drive module incorporating a low torque electric motor coupled through a high ratio reduction to the driveline, and a high torque electric motor coupled through a low ratio reduction to the driveline according to one example of the present disclosure.

Referring now to FIG. 2, an exemplary drive module 122 constructed in accordance to one example of the present disclosure will be described. The first low torque electric motor 116A generally includes a first stator 140A, a first rotor 142A and a first rotatable output or first rotor output shaft 146A. The second high torque electric motor 116B generally includes a second stator 140B, a second rotor 142B and a second rotatable output or second rotor output shaft 146B.

The torque reduction assembly 120 includes a first reduction assembly 120A and a second reduction assembly 120B. The first reduction assembly 120A is associated with the first electric motor 116A. The second reduction assembly 120B is associated with the second electric motor 116B. The overall ratio (first multiplied by second) is greater than the second ratio. The first reduction assembly 120A includes a first ring gear 160A, a first sun gear 164A and a first carrier 166A. The first reduction assembly 120A drives a first reduction output 168 that is input to the second electric motor 116B. The second reduction assembly 120B includes a second ring gear 160B, a second sun gear 164B and a second carrier 166B. The second reduction assembly 120B drives a second reduction output 180 that is input to the driveline 108.

A one-way clutch 170 selectively communicates rotatable input from the output shaft 146A to the first reduction assembly 120A. The one-way clutch 170 allows the first electric motor 116A to stop providing torque toward the driveline 108 when it reaches its maximum speed. The second reduction assembly 120B drives a second reduction output 180 that drives the driveline 108. The exemplary driveline 108 can include a drive assembly 184 having a first gear 184 that drives a second gear 188. The second gear 188 can be associated with a differential assembly 190 that outputs drive torque through drive axles 192A, 192B to drive wheels 194A, 194B. Other configurations for the driveline 108 are contemplated.

Figure 3:
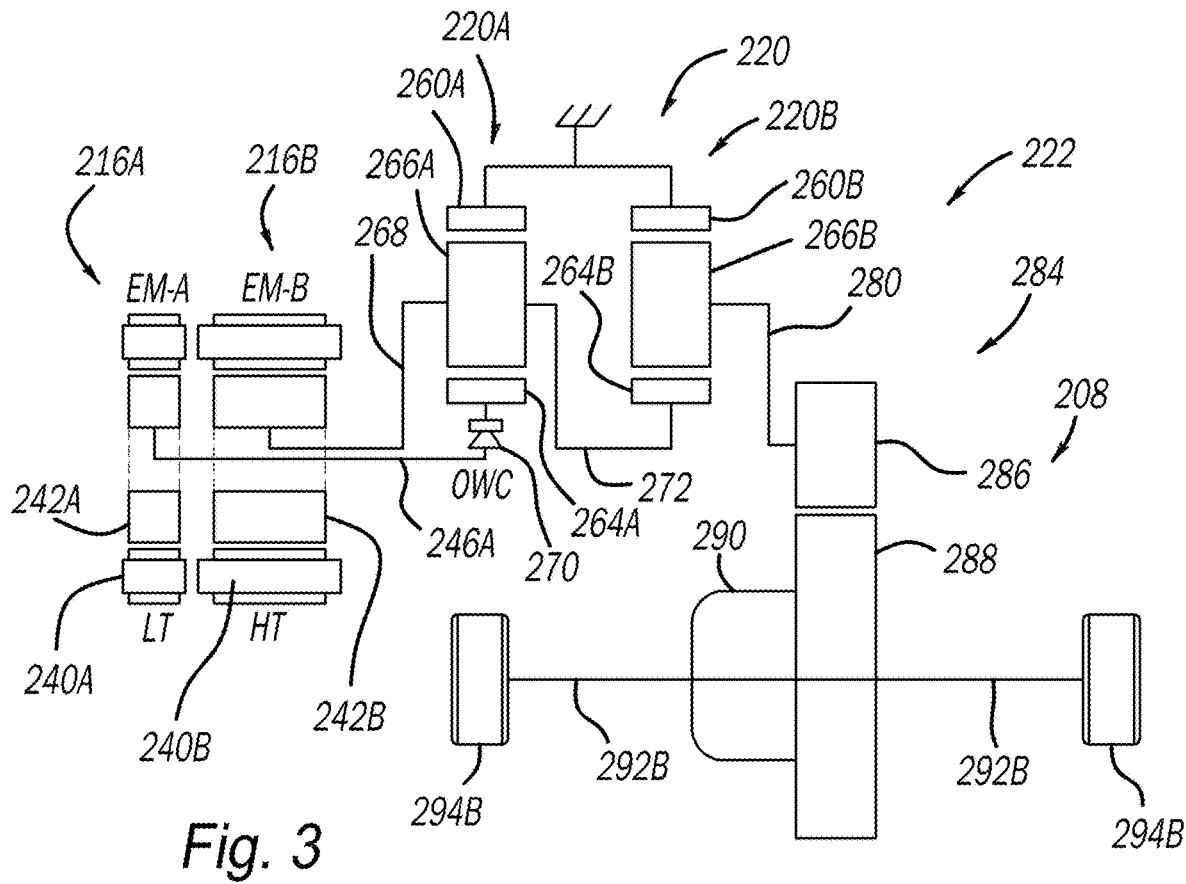
FIG. 3 is a schematic illustration of an electric drive module incorporating a low torque electric motor coupled through a high ratio reduction to the driveline, and a high torque electric motor coupled through a low ratio reduction to the driveline according to another example of the present disclosure.

Referring now to FIG. 3, an exemplary drive module 222 constructed in accordance to one example of the present disclosure will be described. The first low torque electric motor 216A generally includes a first stator 240A, a first rotor 242A and a first rotor output shaft 246A. The second high torque electric motor 216B generally includes a second stator 240B, a second rotor 242B and a second rotor output shaft 246B.

The torque reduction assembly 220 includes a first reduction assembly 220A and a second reduction assembly 220B. The first reduction assembly 220A includes a first ring gear 260A, a first sun gear 264A, and a first carrier 266A. The first carrier 266A of the first reduction assembly 220A is driven by the high torque electric motor 216B through the drive shaft 268. The first ring gear 260A is fixed. The first sun gear 264A is driven by the low torque electric motor 216A through the drive shaft 246A upon closing of the one way clutch 270.

The second reduction assembly 220B includes a second ring gear 260B, a second sun gear 264B, and a second carrier 266B. The first reduction assembly 220A drives output 272 that is input to the second sun gear 264B. The second reduction assembly 220B drives a second output 280 that drives the driveline 208. The exemplary driveline 208 can include a drive assembly 284 having a first gear 284 that drives a second gear 288. The second gear 288 can be associated with a differential assembly 290 that outputs drive torque through drive axles 292A, 292B to drive wheels 294A, 294B. Other configurations for the driveline 208 are contemplated.

The instant application provides an architecture that develops high torque at launch using electric motors with modest torque capacity, without using a multi-speed gearbox (reducer). By way of example only, the high torque electric motor 116B can have an output of between 400 Nm and 500 Nm such as 450 Nm and a maximum speed of 18,000 RPM, while the low torque electric motor 116A can have an output of between 50 Nm and 100 Nm such as 75 Nm and a maximum speed of 18,000 RPM. The high torque electric motor 116B can be coupled to the reduction assembly 120A with a reduction ratio of between 8 and 12 such as 10, while the low torque electric motor 116A can be coupled to the reduction assembly 120B with an overall reduction ratio (4.5 for the first reduction assembly and 10 for the second reduction assembly) of between 40 and 50 such as 45.

The combination gives a total axle torque at launch equal to 7875 Nm. In contrast, if this arrangement would have the electric motors connected to reducers having the same ratio, such as 10, the available launch toque would only be 5250 Nm. The instant configuration achieves about 50% increase in launch torque compared to having single ratio reducers. It will be appreciated that the above values are used merely for demonstration purposes and other reduction ratios, torques and maximum speeds can be incorporated while still achieving similar advantages over the prior art.

The instant architecture achieves high torque at low speed and adequate power at high speed while using a single speed reducer. Further, there is not a major compromise between peak torque output and maximum vehicle speed capability, without having to use a high power electric motor. In both on-road and off-road applications, the performance of the electric machine is generally driven by two requirements at different ends of the spectrum. In a first requirement, high torque at low speed is provided that impacts launch capability and performance and is required for a desired length of time. In a second requirement, high continuous power at high speed that allows the vehicle to maintain maximum vehicle speed for a desired length of time.

The present disclosure provides an architecture that combines a high torque electric motor 116B with a moderate gear reduction 120B and a low torque electric motor 116A with a high gear reduction 120A. The combination allows the low torque electric motor 116A to be used to "boost" the torque output at lower speeds. At higher speeds, the one way clutch 170 allows the electric motor 116A to be overrun since the numerically high ratio could cause the rotor to spin at beyond its rated speed, and the high torque electric motor 116B provides all the propulsion power required.

Figure 4:
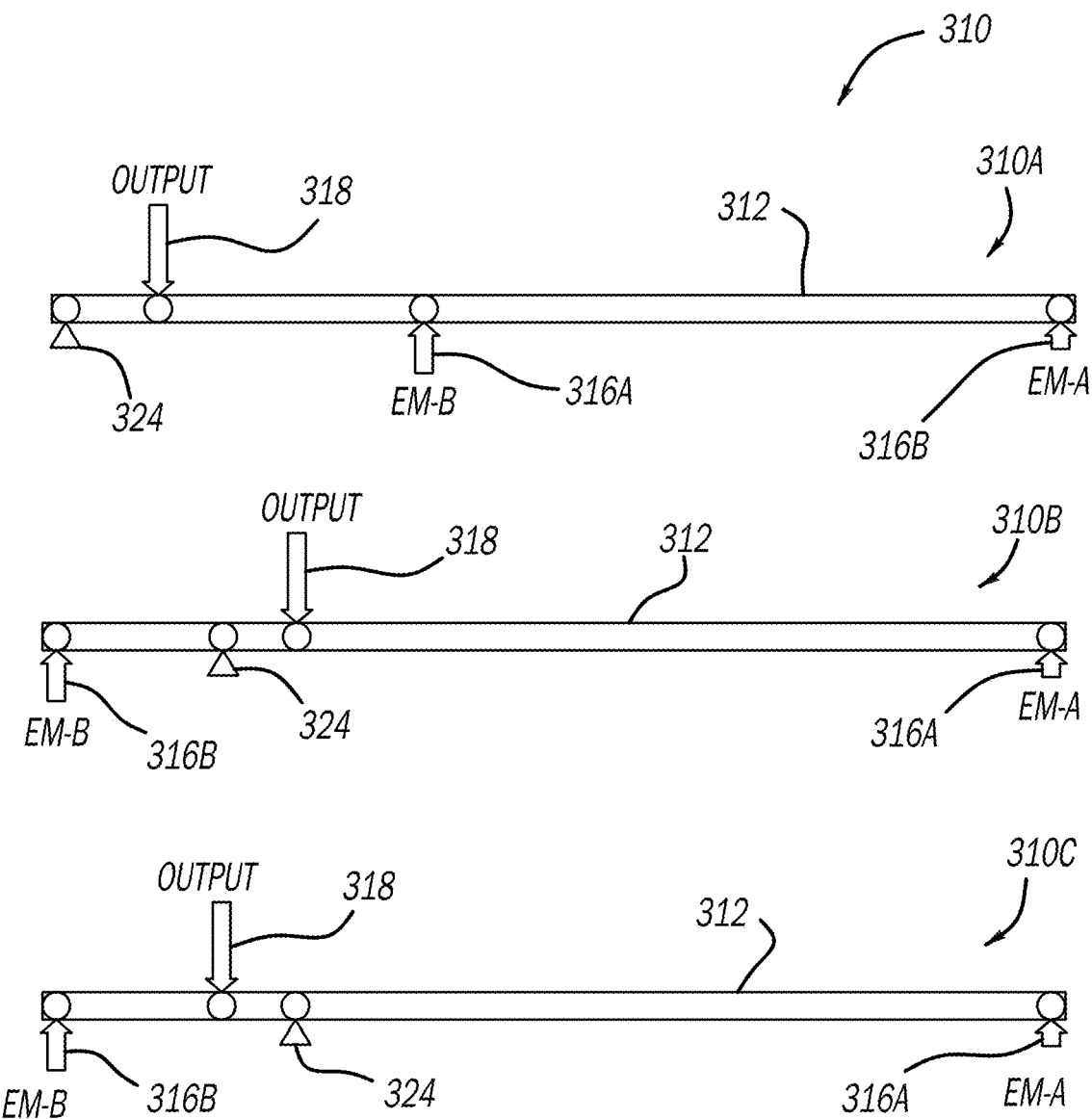
FIG. 4 is a graphical representation of the variations in architecture using lever diagrams according to principles of the present application.

Turning now to FIG. 4, a graphical representation 310 of the variations in architecture using lever diagrams according to principles of the present application is shown. Levers 312 are shown having electric motors 316A, electric motors 316B and planetary gears 324 arranged at various locations. An output 318 is similarly shown at various locations.

The present disclosure provides a first low torque electric motor 116A and a second high torque electric motor 116B. The motors 116 are coupled through the gear reducer unit to the driveline 108 and ultimately drive wheels 194A, 194B. The gear reducer, represented herein as planetary gear sets can additionally or alternatively be helical gear reductions. In one mode, the low torque electric motor 116A is coupled to the gear reducer through the one-way clutch 170 that allows the machine to provide torque to the output in drive and a lower vehicle speeds, but overruns at higher vehicle speeds. In another mode, the induction machines can be utilized to avoid the use of the one-way clutch 170 completely. In another mode, two one-way clutches can be used to allow the electric motors 116 to be used in both forward and reverse and during motoring and regeneration operations.

It will be appreciated that the term "controller" or "module" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present application, its application or uses. Thus, variations that do not depart from the gist of the present application are intended to be within the scope of the present application.

What is claimed is:

1. An electric drive module for an electrified vehicle, the electric drive module comprising:
   a first electric motor having a first stator, a first rotor and a first rotatable output;
   a second electric motor having a second rotatable output, wherein the first electric motor has a lower output capacity than the second electric motor;
   a first reduction assembly that is driven by the first rotatable output and includes a first reduction output that is coupled to the second electric motor;

a second reduction assembly that is driven by the second rotatable output of the second electric motor and includes a second reduction output, wherein the first reduction assembly and the second reduction assembly cooperate to provide a combined first effective reduction ratio driven by the first rotatable output and wherein the second reduction assembly provides a second effective reduction ratio driven by the second rotatable output, the first effective reduction ratio being higher than the second effective reduction ratio;

a one-way clutch disposed between the first rotatable output of the first electric motor and the first reduction assembly; and a driveline that receives torque from the second reduction output and communicates the torque to drive axles of the electrified vehicle.

2. The electronic drive module of claim 1, wherein the second electric motor comprises a second stator, a second rotor and the second rotatable output.

3. The electronic drive module of claim 2, wherein the first reduction assembly comprises a first planetary gearset having a first ring gear, a first sun gear and a first carrier, wherein the first ring gear is fixed, and the first sun gear is driven by the first rotatable output of the first electric motor.

4. The electronic drive module of claim 2, wherein the second reduction assembly comprises a second planetary gearset having a second ring gear, a second sun gear and a second carrier, wherein the second ring gear is fixed second sun gear is driven by for the second rotatable output of the second electric motor.

5. The electronic drive module of claim 1, wherein the first reduction assembly has a reduction ratio of between 8 and 12.

6. The electric drive module of claim 1, wherein the first electric motor has an output of between 50 and 100 Nm.

7. The electric drive module of claim 1, wherein the second electric motor has an output of between 400 and 500 Nm.

8. An electric drive module for an electrified vehicle, the electric drive module comprising:

a first electric motor having a first rotatable output;

a second electric motor having a second rotatable output, wherein the first electric motor has a lower output capacity than the second electric motor;

a first reduction assembly that is driven by the first rotatable output and includes a first reduction output;

a second reduction assembly that is driven by the first reduction output and includes a second reduction output, wherein the first reduction assembly and the second reduction assembly cooperate to provide a combined first effective reduction ratio driven by the first rotatable output and wherein the second reduction assembly provides a second effective reduction ratio driven by the second rotatable output, the first effective reduction ratio being higher than the second effective reduction ratio; and a one-way clutch disposed between the first rotatable output of the first electric motor and the first reduction assembly, wherein the one-way clutch allows the first electric motor to stop providing torque when the first electric motor reaches a maximum speed.

9. The electronic drive module of claim 8, wherein the first electric motor comprises a first stator, a first rotor and the first rotatable output.

10. The electronic drive module of claim 9, further comprising a driveline that receives torque from the second reduction output and communicates the torque to drive axles of the electrified vehicle.

11. The electronic drive module of claim 10, wherein the second electric motor comprises a second stator, a second rotor and the second rotatable output.

12. The electronic drive module of claim 10, wherein the first reduction assembly comprises a first planetary gearset having a first ring gear, a first sun gear, and a first carrier wherein the first ring gear is fixed, the first sun gear is selectively fixed for rotation with the first rotatable output of the first electric motor by the one-way clutch, and the first carrier is fixed for rotation with the second rotatable output of the second electric motor.

13. The electronic drive module of claim 12, wherein the second reduction assembly comprises a second planetary gearset having a second ring gear, a second sun gear, and a second carrier, wherein the second ring gear is fixed and the second sun gear is fixed for rotation with the first carrier.

14. The electronic drive module of claim 8, wherein the first reduction assembly has a reduction ratio of between 8 and 12.

15. The electric drive module of claim 8, wherein the first electric motor has an output of between 50 and 100 Nm.

16. The electric drive module of claim 8, wherein the second electric motor has an output of between 400 and 500 Nm.

* * * * *